May 21, 1957     D. B. WHITNEY ET AL     2,792,748
LENS TESTING DEVICE

Filed March 8, 1954     3 Sheets-Sheet 1

INVENTORS
DONALD B. WHITNEY
JAMES H. WING
BY ROBERT E. HAYNES

Louis L. Gagnon
ATTORNEY

May 21, 1957   D. B. WHITNEY ET AL   2,792,748
LENS TESTING DEVICE
Filed March 8, 1954   3 Sheets-Sheet 2

INVENTORS
DONALD B. WHITNEY
JAMES H. WING
ROBERT E. HAYNES
BY
*Louis L. Gagnon*
ATTORNEY United States Patent Office
2,792,748
Patented May 21, 1957

2,792,748
LENS TESTING DEVICE

Donald B. Whitney, Southbridge, and James H. Wing and Robert E. Haynes, Sturbridge, Mass., assignors to American Optical Company, Southbridge, Mass., a voluntary association of Massachusetts Application March 8, 1954, Serial No. 414,712

11 Claims. (Cl. 88—56)

This invention relates to the testing of lenses to determine certain of the optical characteristics thereof and has particular reference to novel apparatus for automatically determining the location of the optical center of a lens and subsequently or simultaneously determining automatically the focal characteristics of the lens.

Although many devices have been developed for manually or semi-automatically locating the optical center of a lens or similar article, such known devices have generally been impractical or inefficient for use in modern high-speed lens production systems. Attempts also have been made to develop fully automatic lens testing devices but in most known instances such devices have been unsatisfactory for various reasons such as being unstable, too slow, expensive, or otherwise undesirable.

Therefore, it is a primary object of this invention to provide novel means of a fully automatic nature satisfactory and dependable for use in modern production systems for determinng certain optical characteristics of lenses or like articles.

Another object is to provide a novel device for automatically determining optical characteristics such as the location of the optical center of a lens or like article, which device may embody means for marking the lens or like article to indicate said center and which may also function co-operatively with automatic means for determining the focal characteristics of said lens or like article.

Another object is to provide a novel means for testing a lens or like article to determine optical characteristics such as the location of the optical center thereof by providing means for directing a light beam along a predetermined optical axis through the lens to form an image in or adjacent to a predetermined focal plane and at a point located with respect to a known point in said focal plane in accordance with the spaced relation of the optical center of the lens with respect to the geometric center of the lens, and further providing means for adjusting said lens under test and/or said known point to align them with respect to said optical axis whereby said image will be coincident with said known point, and measuring means for calculating the extent of said adjustment to determine whether said optical center is located within tolerable space limitations of said geometric center.

Another object is to provide apparatus of the above character with means for marking upon a surface of the lens the location of the optical center thereof as determined by the apparatus.

A further object is to provide apparatus of the above character with means for automatically determining the focal characteristics of the lens under test.

Another object is to provide improved means and method for automatically locating the optical center of a lens under test to determine whether said optical center is within prescribed space tolerances of the geometric center thereof, for subsequently marking the location of the optical center of said lens on a surface thereof if said center is located within said tolerances, and for either simultaneously or subsequently automatically determining the focal characteristics of said lens under test.

A further object is to provide novel means for testing a lens to determine the location of the optical center thereof comprising a light source for directing light rays along a predetermined optical axis through said lens under test to a light receiving device in the form of a member having a plurality of angularly disposed reflecting sides and a known image point, photosensitive devices associated with said reflecting sides for operation in response to reception of said light rays as reflected by said reflecting sides and operable to move said lens and/or said light-receiving device to the extent necessary to cause said light rays to be directed by the lens under test onto said known image point, and means for automatically analyzing the extent of such movement of the lens and/or light-receiving device and determining therefrom whether the location of the optical center of the lens is within prescribed space requirements of said geometric center.

A further object is the provision of an optical system for directing light rays through a lens under test toward a light-receiving device comprising a pyramid-shaped member having highly reflecting sides for directing light towards a respective photosensitive device and having a central flat portion, the light rays passing through said lens under test being directed onto a particular side of the pyramid-shaped member in accordance with the particular location of the optical center thereof and being reflected by said side onto a photosensitive device which is operable thereupon to move either the lens or the pyramid-shaped member the extent necessary to cause the light to be directed onto the central flat portion of the pyramid-shaped member where it will not reflect onto a photosensitive device, thus stopping further movement of the lens or pyramid-shaped member, the apparatus further embodying means for determining from an analysis of the movement of the lens or pyramid-shaped member whether the optical center is within prescribed space requirements of the geometric center of the lens.

A still further object is the provision of marking means for apparatus of the above character which is operable only when the lens and pyramid-shaped member have been finally adjusted with respect to one another for automatically indicating on a surface of the lens the exact location of the optical center thereof.

A still further object is to provide automatic means combined with apparatus of the above character for determining the focal power of the lens under test either simultaneously with or subsequent to the centering and embodying means for varying the light rays passing through the lens, electronically analyzing the resultant image to record the varying focal characteristics of the image as influenced by the variation in the light rays and by the focal characteristics of the lens under test, and translating the analysis into a visible record indicating the focal power of the lens under test.

A still further object is to provide a device for automatically determining the location of the optical center of a lens regardless of its light transmission characteristics, which device will perform its function efficiently without requiring skill on the part of an operator or labor such as is involved in performing such tests by conventional methods, and which device may embody means for automatically marking the center on the lens and means for automatically determining the focal power of the lens.

Other objects and advantages of the invention will become apparent from the following description taken in connection with the accompanying drawings, in which.

The device embodying the invention is particularly adaptable to the manufacture of lenses which are to be positioned in ophthalmic frames as it is necessary to provide such lenses with a controlled contour shape, which contour shape is selected from a wide variety of lens shapes and sizes. It is important, therefore, to determine where the optical center of a lens lies with respect to the geometric center so that when edging the lens to provide it with the desired contour shape it can be properly formed. It is known for example, that some extreme lens shapes require larger blanks than others. Therefore, it has been found that if the optical center of a particular lens is located within a predetermined distance from the geometric center the lens can be provided with any one of a specified range of lens shapes. Thus, it is necessary to determine the space relation between the optical and geometric centers of a lens.

Another desirable feature is the provision of means for marking the location of the optical center on a surface of the lens. The present invention discloses means for placing a dot on the lens to visually indicate the location of the optical center, and still further discloses means for determining the focal power of the lens.

Figure 1:
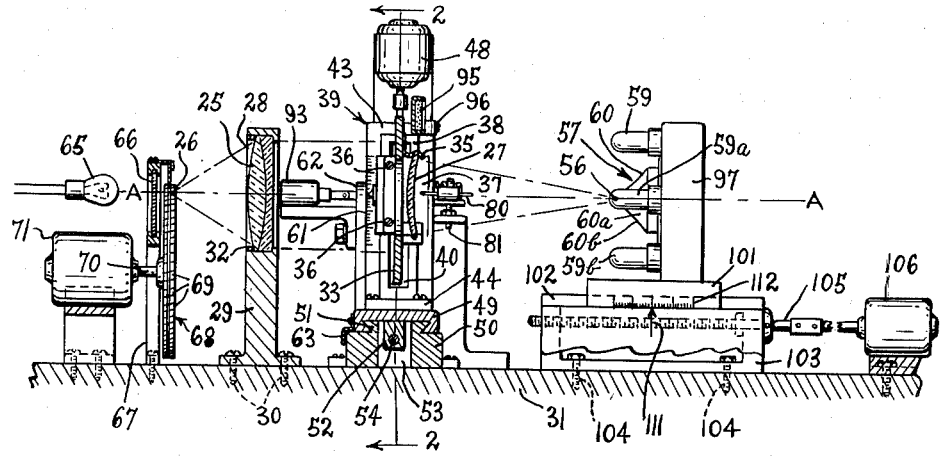
Fig. 1 is a diagrammatic view of a system embodying the present invention.

One successful device embodying this invention is shown in Fig. 1 of the attached drawings and embodies an optical system for directing light through a lens under test toward a predetermined point and onto one or another of a plurality of photosensitive devices which function to cause operation of suitable electrical devices for moving the lens or the predetermined point to such an extent as is necessary to cause the light to fall directly upon the predetermined point. It is apparent that if a lens was located in a plane normal to the axis of the optical system with its geometric center on the axis and if the predetermined point also was located on the axis adjacent the focal plane of the lens, that the light traveling parallel to the axis and passing through the lens will be directed toward and will be imaged upon the predetermined point if the optical center of the lens is coincident with the geometric center. However, if the optical center is spaced from the geometric center the image will not fall on the predetermined point. Therefore, the extent of movement of the lens or of the predetermined point which is necessary to cause the image to fall upon the point can be measured to determine the spacing between the optical and geometric centers and to determine whether the lens is satisfactory for subsequent edging or must be rejected.

Figures 2, 3:
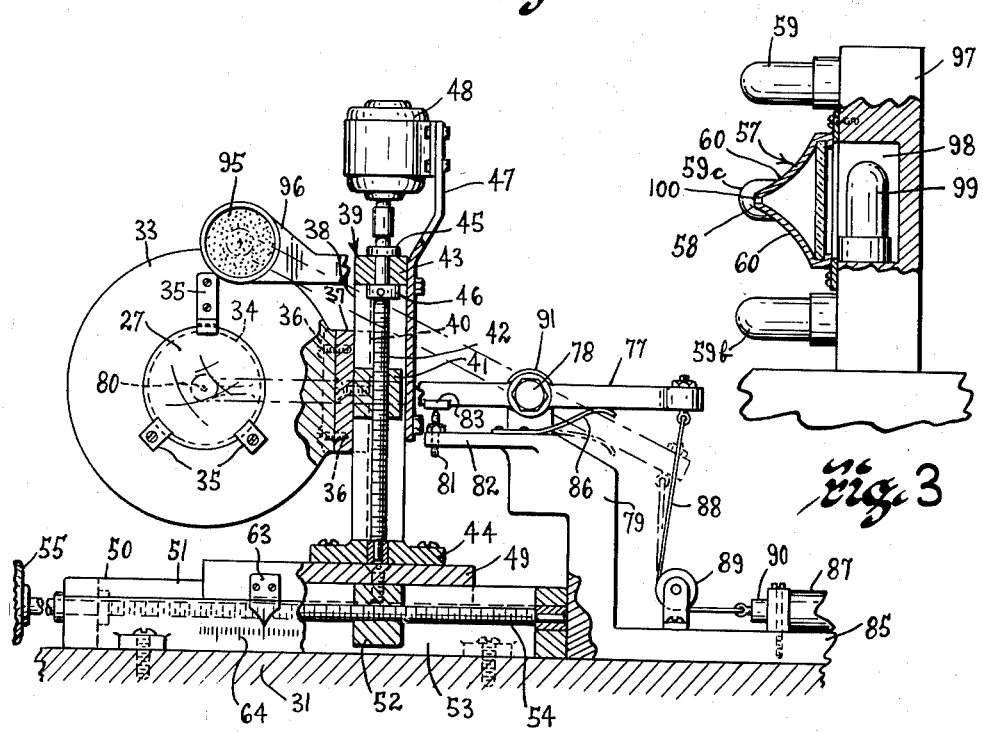
Fig. 2 is an enlarged sectional view taken substantially on line 2—2 of Fig. 1 looking in the direction of the arrows.
Fig. 3 is an enlarged view partly in section of the reflecting member and supporting means for the photosensitive devices.

The optical system comprises a collimator lens 25 which picks up light from an object point 26 and transmits it as effectively parallel rays to a lens 27 under test. The collimator lens 25 is securely mounted in an opening 28 in an upright 29 which is relatively fixedly secured as by screws 30 or the like to a suitable base or support 31, the lens 25 being held within the opening 28 by any suitable means such as retaining ring 32. The lens 27 under test is positioned and held in a plane at right angles to the optical axis A—A of the system by means of an apertured disc 33 (Figs. 1 and 2). The lens 27 is held in position over the aperture 34 by means such as spring clips 35, and the disc 33 is attached as by bolts or screws 36 to a block 37 which is mounted for sliding movement upon a surface 38 of an upright support 39. The support 39 is provided with a vertically extending slot 40 into which extends a portion 41 of the block 37. Extending through and threadedly connected to the portion 41 is a threaded drive shaft 42 which has its opposed end portions journaled in the respective upper and lower end portions 43—44 of support 39. A pair of collars 45—46 are secured to the shaft 42 adjacent the opposed inner and outer surfaces of the upper end portion 43 to prevent displacement of the shaft 42. The support 39 also carries an upwardly extending bracket 47 to which is bolted a reversible motor 48 which is operatively connected to the adjacent upper end of the drive shaft 42. Operation of the motor 48 in one direction will effect rotation of the drive shaft 42 and consequently cause vertical movement of the block 37, disc 33 and lens 27 under test. Reverse rotation of the motor 48 will cause the shaft 42 to be rotated in the opposite direction and consequently cause the block 37, disc 33 and lens 27 to also be moved in the opposite direction.

The lower end portion 44 of the support 39 is secured as by screws or the like to a slide 49 which is mounted for sliding movement longitudinally of a bed 50 on the shelf 31. The bed 50 is provided on its upper surface with a portion 51 (Fig. 1) having angled sides which are adapted to slidably interfit with a longitudinal grooved or recessed area in the underside of the slide 49, thus providing means for guiding the slide 49 during movement transversely of the device. The slide 49 carries a block 52 which depends from the lower surface thereof downwardly into a slot or opening 53 which extends longitudinally within the bed 50. A threaded drive shaft 54 is journaled in the ends of the bed 50 and is operatively connected with the block 52, one end of the shaft 54 being connected to a reversible motor 55 whereby the shaft may be rotated to move the block 52 and slide 49 transversely of the device, and consequently also move the lens holding means carried by the slide 49 in a transverse direction within a plane at right angles to axis A—A, which plane is the same plane in which the lens holding means is movable vertically, as described above, by operation of motor 48. From this it is apparent that the lens 27 under test can be adjusted in any direction within a plane disposed at right angles to the axis A—A of the optical system, such adjustment being accomplished by operation of the motors 48 and 55 either simultaneously or individually.

The light from the object point 26 is directed as substantially parallel rays to the lens 27 under test which functions to then converge the rays, causing them to focus substantially at a remote focal point 56 (Fig. 1) in accordance with the focal power characteristics of the lens 27.

It is to be understood here that if a lens 27 under test is positioned in a plane at right angles to the axis A—A with its geometric center on axis A—A, and if the optical center of the lens is coincident with the geometric center, the focal point 56 will also be on axis A—A.

Figure 5:
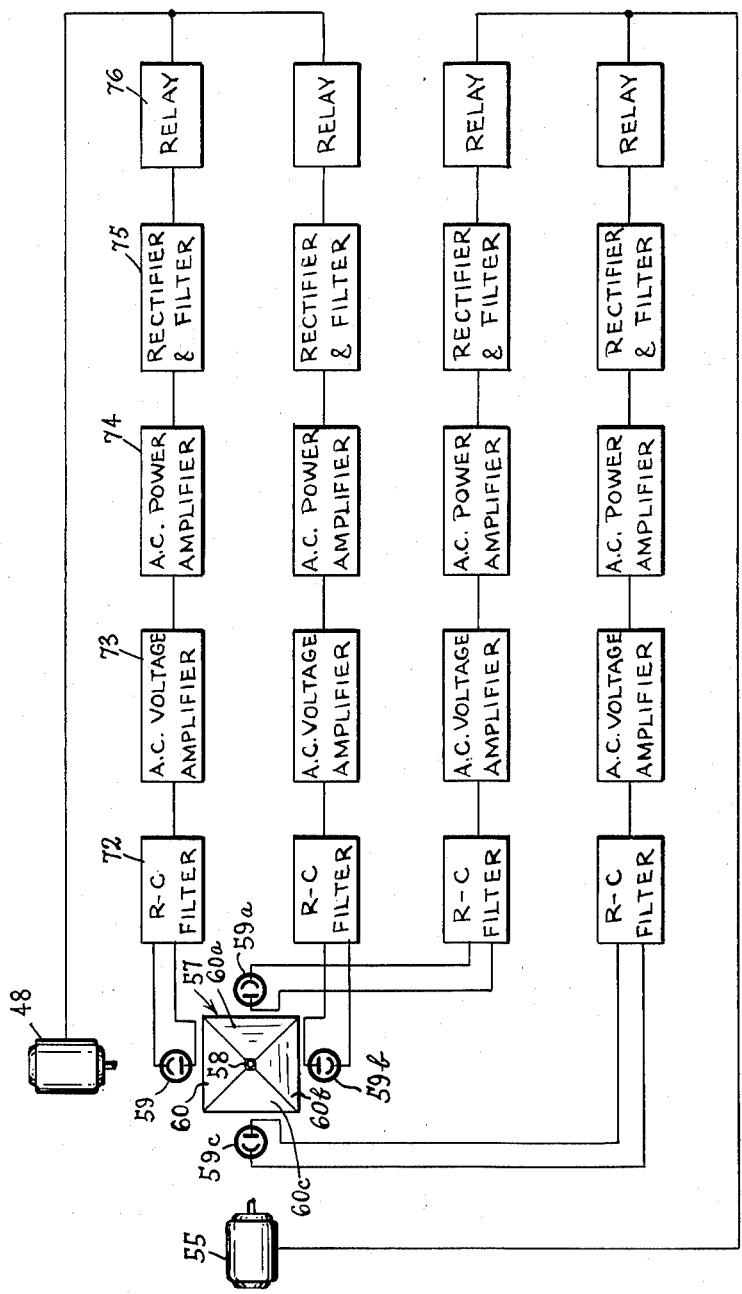
Fig. 5 is a diagrammatic illustration of the preferred centering control means.

A reflecting member 57 is positioned on axis A—A adjacent the focal point 56 and is adapted to receive the light from the lens 27. The reflecting member 57 is preferably formed as a four-sided pyramid, the extreme tip or apex of which is removed to form a square flat area 58 (Fig. 3), and may be formed of glass having a reflective coating on its exterior surface or may be made of metal having a highly polished reflective outer surface. The base of the reflecting member 57 is secured as by screws or the like to a supporting block 97 which also carries four photosensitive devices 59, 59a, 59b and 59c such as photocells or the like, the photosensitive devices each being positioned adjacent respective angled sides or surfaces 60, 60a, 60b or 60c of the reflecting member 57 (Fig. 5). It is apparent that light rays passing from the lens 27 and engaging a side of the reflecting member 57 will be reflected thereby to a respective photosensitive device.

Assuming that a lens 27 under test was provided with an optical center not coincident with the geometric center, this would cause the light rays to be directed onto one or another of the sides 60—60c of the reflecting member 57 rather than upon the flat area 58 which is aligned with axis A—A. In order to determine the spacing between the optical center and the geometric center of the lens 27 it is necessary, in accordance with this invention, to move the lens 27 to the extent necessary to align the optical center with axis A—A whereupon the light rays will be directed to the flat area 58 of the reflecting member 57. In order to accomplish this each photosensitive device 59-59c has connected thereto a respective electrical circuit shown in Fig. 5 which functions to cause operation of one or the other of the reversible motors 48 and 55. For example, assuming that the optical center of the lens 27 is located below the geometric center thereof, which geometric center is substantially aligned with axis A—A, it is necessary to move the lens upwardly to align the optical center with axis A—A. In such a case the light rays from lens 27 will initially be directed onto the lower angled side 60b of the reflecting member 57 and will be reflected thereby to the lower photosensitive device 59b. The photosensitive device 59b then will function to cause motor 48 to operate in the direction required to raise the lens 27. Raising of the lens 27 will consequently cause the light rays engaging the side 60b of the reflecting member 57 to consequently be raised until they engage the flat area 58 whereupon they will not be reflected to the photosensitive device 59b or to any other of the photosensitive devices 59, 59a or 59c and consequently the motor 48 will be stopped, indicating that the optical center of the lens 27 is now aligned with the axis A—A. The extent of such upward movement of the lens can be visually observed from a scale 61 (Fig. 1) which is provided on the side of the support 39 and which is adapted to function co-operatively with an indicator 62 which is carried by the vertically sliding block 37. Thus, an operator of the device can determine whether or not the optical center of the lens is within predetermined spaced limitations of the geometric center.

It is to be understood, of course, that if the optical center of the lens 27 was located above the geometric center, that the light rays would be reflected by the upper side 60 of the reflecting member 57 to the upper photosensitive device 59 which, through a respective electrical circuit, will cause motor 48 to operate in the direction necessary to lower the lens 27 to the extent necessary to align the optical center with axis A—A. Likewise, if the optical center is located at one side of the geometric center the light rays will be directed onto a corresponding side 60a or 60c of the reflecting member 57 whereupon they will be reflected to the respective photosensitive device 59a or 59c which will function to cause operation of reversible motor 55 to move the lens 27 in whichever direction is necessary to align the optical center with axis A—A. The extent of such transverse movement of the lens is indicated by an indicator 63 which is carried by the slide 49 and which functions co-operatively with a scale 64 which is provided on the adjacent side of the bed 50. It is also conceivable that the motors 48 and 55 may operate simultaneously, which would be the case if the light rays were reflected onto the ridge separating two adjacent sides 60—60c of the reflecting member 57.

It will be noted from examination of Fig. 3 that the sides 60—60c of the reflecting member 57 are preferably formed substantially spherical and concave. This is to concentrate the light rays reflected thereby onto a relatively small area of the respective light sensitive devices.

It has been found that the centering device described above functions most efficiently when using electrical circuits which are insensitive to light of approximately 60 cycles. Since the photosensitive devices will generally respond to stray light, that is, light other than that reflected thereto by the reflecting member 57, and since the device embodying the present invention is used at least part of the time in artificial light of 60 cycles, means has been provided for modulating the light rays to be used by the present device so that the effective light reflected by the reflecting member 57 onto the photosensitive devices will be of a controlled frequency which may be separated from stray light by the electrical circuits connected to the photosensitive devices.

In the present device the effective object point 26 is illuminated by means such as a suitable lamp 65 (Fig. 1), the light therefrom being diffused by a diffusing plate 66 supported between the lamp 65 and object point 26 by means such as standard 67 mounted on the base 31. The means for modulating the light to control the effective cycle thereof includes a target 68 which is formed as a wheel or disc having a predetermined number of teeth or occluders 69 on its periphery. The target 68 is disposed in a plane at right angles to axis A—A and is mounted on a motor drive shaft 70 for rotation by a motor 71 about an axis parallel with axis A—A. The target 68 is also arranged so that the teeth or occluders 69 on the periphery thereof are adapted, when the target is rotated by the motor 71, to successively pass through object point 26 and thus to alternately block and permit passage of light from the object point 26. It has been found that a target 68 having a selected number of teeth or occluders 69 will establish a very satisfactorily functioning modulation of the light when rotated at such a speed as to cause, for example, 832 cycles per second. This can be done, of course, by providing 832 occluders and rotating the target one revolution per second, or by providing fewer teeth and a faster rate of rotation. It is to be understood that although 832 C. P. S. has been found to be satisfactory other cycles will work equally as well.

It has also been found desirable to control the light rays impinging upon the reflecting member 57 so that when the square flat area 58 is located substantially at the focal point of the lens 27 the spot of light formed by the focussing of the light rays will be of a diameter substantially the width of the area 58. To achieve this, the target 68 is provided with a groove or slot 113 (Figs. 6 and 7) which extendes entirely around its periphery substantially midway between the side surfaces of the target 68, the slot 113 splitting each of the occluders 69. Into the slot 113 extends an opaque member 114 which intersects axis A—A and which is carried as by a bracket 115 secured to the standard 67 carrying the diffuser 66. The opaque member 114 is provided with an aperture 116 which is located therein in such a manner that the object point 26 is at the center of the aperture 116. The aperture 116 is of a controlled size in accordance with the size desired of the light beam at the reflecting member 57.

From the foregoing, it will be apparent that light of 832 cycles, or other selected frequency, will be reflected by the reflecting member 57 onto a respective photosensitive device 59—59c. In describing the electrical circuits connecting the photosensitive devices 59—59c with the motors 48 and 55, it will be assumed that light is being reflected by the surface 60 of reflecting member 57 onto photosensitive device 59. The photosensitive device 59 will respond by sending a signal to a resistance-capacitance filter 72 which attenuates or reduces the signal component caused by modulation of the photosensitive device by stray light of power line frequency. This permits the desired frequencies present in the system, such as 832 C. P. S., to pass on in the circuit.

From the filter 72 the signal passes to an AC voltage amplifier 73 where the voltage thereof is amplified in accordance with the selected voltage gain of the particular amplifier used. Then the signal passes to a power amplifier 74 where sufficient power is developed for operation of subsequent electro-mechanical devices. The signal then goes to a rectifier and filter device 75 where it is converted to D. C. to drive a relay 76 which controls operation of the motor 48 to cause the motor 48 to drive the lens supporting mechanism downwardly.

A similar circuit connects photosensitive device 59b with the motor 48 to cause operation of the motor 48 in the reverse direction to move the lens 27 upwardly, and two similar circuits connect photosensitive devices 59a and 59c respectively with motor 55 to adjust the lens 27 transversely.

Figure 8:
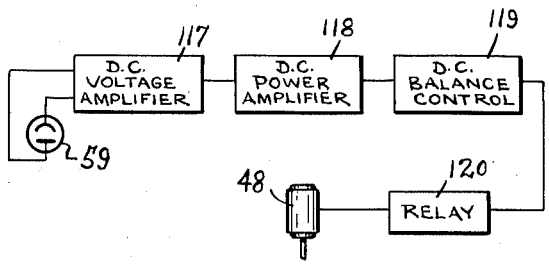
Fig. 8 is a diagram of a D. C. control means.

Although the foregoing description refers to A. C. circuits for controlling the operation of motors 48 and 55, it is to be understood that D. C. circuits may be used if desired. A diagram showing photosensitive device 59 connected to motor 48 by a D. C. circuit is illustrated in Fig. 8. In such a circuit the signal from photosensitive device 59 goes directly to a D. C. voltage 117 amplifier where it is amplified and passed onto a D. C. power amplifier 118 for development of sufficient power, then to a D. C. balance control 119 which is used to cancel out in the signal the effect of quiescent operating currents so that a relay 120 connected thereto will receive only the current provided as a result of the signal from the photosensitive device 59. The relay 120 operates to control the motor 48 as in the A. C. circuits described hereinabove.

It is pointed out here that if the scanning aperture 100 is not located at the focal point of the lens 27, the light rays striking the reflecting member 57 will form a relatively large image thereupon which may strike two or more of the sides 60—60c of the member 57 and thus possibly be reflected onto two of the photosensitive devices used for operating the same motor 48 or 55. In such a case, since the photosensitive devices are adapted to function in response to variations in light intensity, it is apparent that the photosensitive device governing the control of the particular motor 48 or 55 will be the one receiving the greater amount of light. For example, if light fell simultaneously on sides 60 and 60b, but more light fell on 60 than on 60b, photosensitive device 59 would control operation of motor 48 rather than photosensitive device 59b, which would operate to lower the lens 27 until the light intensities on the photosensitive devices 59 and 59b were substantially equal. In this connection, it is pointed out here that the focussing mechanism to be described hereinafter will simultaneously operate to adjust the lens 27 and reflecting member 57 along axis A—A so that eventually the light beam at the reflecting member 57 will occupy only the square flat area 58.

Figure 4:
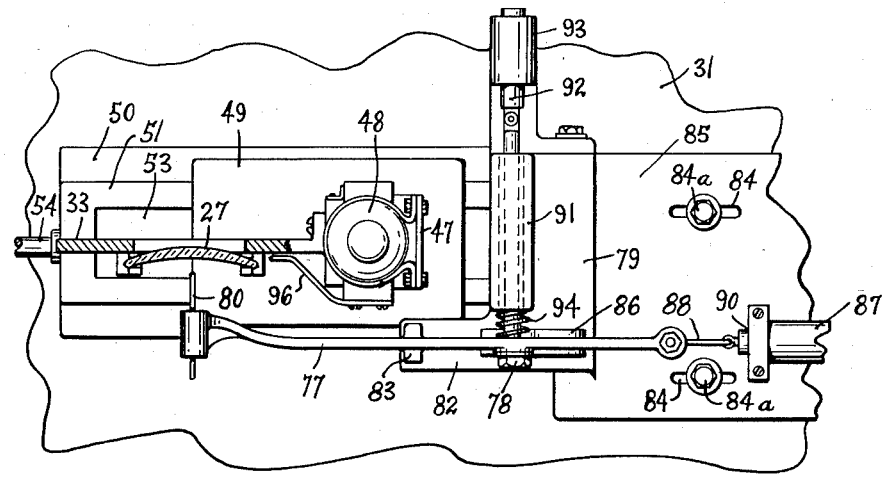
Fig. 4 is an enlarged top plan view of the lens supporting means.

After the lens 27 has been adjusted to the position wherein its optical center is located on axis A—A, dotting mechanism connected into the electrical system may be used to print a dot on one of the lens surfaces to identify the optical center. The dotting mechanism is shown in Figs. 1, 2 and 4 and comprises an arm 77 which extends transversely of the device substantially parallel with the bed 50 and which is pivotally connected by a pivot stud 78 to a supporting bracket 79 carried by the base 31. The arm 77 is adapted to swing in a vertical plane and is of such length that one end thereof, preferably the forward end, is enabled to be swung into and out of axis A—A adjacent the surface of the lens 27 which is to be dotted. The extreme end of the arm 77 carries a dotting instrument such as a needle-like pen 80 which is positioned to extend along axis A—A when the arm 77 is in lowered position. An adjustable stop 81 carried by a protruding portion 82 of the bracket 79 is adapted to be engaged by a pad 83 on the arm 77 to control the extent of downward swinging movement of the arm 77 whereby the pen 80 will be accurately aligned vertically with respect to axis A—A. Transverse adjustment and alignment of the pen 80 with the axis A—A is accomplished by means of slots 84 (Fig. 4) in the base portion 85 of the bracket 79 through which extend bolts 84a which serve to attach the bracket 79 to the base 31. Thus, by transverse adjustment of the bracket 79 on base 31 the pen 80 can be transversely aligned with axis A—A.

A flat spring 86 (Figs. 2 and 4) is attached at one end to the bracket 79 and has its other end bearing upon the underside of arm 77 rearwardly of the pivot stud 78 to constantly urge the forward end of the arm 77 downwardly. The arm 77 is normally held in raised inoperative position away from axis A—A by a solenoid 87 which is secured to the base portion 85 of the bracket 79 and is connected to the rear end of arm 77 by a cable 88 which extends over a pulley 89, mounted on the base portion 85, as shown in Fig. 2. When the solenoid 87 is energized it will cause the core 90 thereof, to which the cable 88 is attached, to move inwardly, drawing with it the cable 88, causing the adjacent end of the arm 77 to move downwardly, and thus swinging the forward end of the arm 77 and pen 80 upwardly to the position shown by dot-dash lines in Fig. 2.

The bracket 79 has an upper portion 91 which slidably receives the pivot stud 78 (Fig. 4). The arm 77 is located adjacent one end of the pivot stud 78 while the other end of the pivot stud 78 is attached to the core 92 of a second solenoid 93. With the solenoid 93 de-energized, a compression spring 94 on pivot stud 78 between the arm 77 and the upper portion 91 of bracket 79 functions to urge the arm 77 in a direction away from the solenoid 93 and away from the lens 27. In normal inoperative condition of the dotting mechanism both solenoids 87 and 93 are energized, solenoid 87 functioning as described to raise the arm 77 to a position where the pen 80 is substantially aligned with an ink pad 95 (Figs. 1 and 2) carried by a bracket 96 attached to the upper end of support 39, and solenoid 93 functioning to urge the arm 77 against the action of spring 94 in a direction toward the solenoid 93 whereupon the pen 80 will rest upon the ink pad 95.

In the cycle of operation of the device, when the lens 27 has been adjusted as described hereinbefore, solenoid 93 will become de-energized and spring 94 will urge the arm 77 outwardly to remove the pen 80 from the ink pad 95. Then solenoid 87 will become de-energized to allow spring 86 to move the arm 77 downwardly against the stop 81 and thus align the pen 80 with axis A—A. Then solenoid 93 will become momentarily energized to draw the arm 77 inwardly, which will cause the pen 80 to contact the adjacent surface of the lens 27 and make a small ink impression upon the lens surface at the exact optical center thereof. After such momentary energization of the solenoid 93, solenoid 87 will again function to swing the arm 77 upwardly to its inoperative position, after which solenoid 93 again will become energized to draw the arm 77 inwardly whereupon the pen 80 will again be positioned upon the ink pad 95.

From the foregoing it is apparent that a lens 27, after being positioned in the device, can be automatically adjusted with respect to the optical axis of the device for determining the relative spacing between the optical center and geometric center of the lens, after which dotting mechanism can automatically function to make an impression upon the surface of the lens in the exact location of the optical center thereof.

To provide means for determining the focal power of the lens 27, the block 97 for supporting the photosensitive devices is provided with a recess 98 (Fig. 3) in its surface adjacent the reflecting member 57 and within the recess is positioned a photosensitive device 99 such as a photomultiplier. The flat square area 58 at the apex of the reflecting member 57 is provided with a scanning aperture or pinhole 100 and the reflecting member 57 is mounted over the recess 98. Thus, the light rays from the lens 27 under test, when the lens 27 is centered, fall upon the area 58 and pass through the pinhole 100 onto the photomultiplier 99.

The scanning aperture 100 is adapted to be positioned at the image point of the optical system and the photomultiplier 99 functions co-operatively therewith to form a signal having characteristics determined by the space relation between the image point of the system and the aperture 100, the signal being analyzed by suitable electronic mechanism to cause adjustment of the aperture 100 to determine the focal characteristics of the lens 27. Such a method of determining focal characteristics of a lens is fully shown and described in pending United States patent application, Serial Number 394,546, filed November 27, 1953, by Roy C. Gunter, Donald B. Whitney and Robert E. Haynes.

In a device of this type the aperture 100 is adapted to be adjusted along axis A—A. To accomplish this the supporting block 97 is mounted on a slide 101 which is slidable in a direction parallel with axis A—A on slideways 102 formed on the surface of a bed 103 which is bolted or otherwise secured as at 104 to the base 31. The slide 101 is connected by suitable driving means 105 to a reversible motor 106 whereby the slide 101, block 97, and aperture 100 can be moved longitudinally of axis A—A.

The electronic mechanism for controlling the movement of the aperture is adapted to operate in response to the "spatial frequency" of the optical system as affected by the focal power of the lens under test and as described in the above-mentioned copending application. To achieve such a function it is necessary to provide the occluders 69 of the target 68 with "depth" characteristics. This is done by angling the inner sides of each occluder 69 as shown in Fig. 5 and by disposing the target 68 so that the object point 26 will be located approximately midway between the planes of the front and rear surfaces of the occluders 69.

Figure 6:
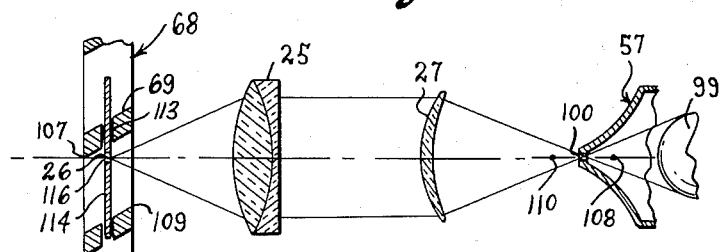
Fig. 6 is a diagrammatic view of the optical system illustrating the scanning aperture in adjusted position with respect to the focal point of the lens under test.
Figure 7:
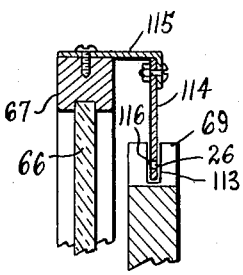
Fig. 7 is an enlarged vertical sectional view taken through the upper portion of the scanning target.

Fig. 6 shows the device in a condition where the aperture 100 is located at the focal point of the lens 27. In such a condition, as the target 68 is rotated a "trailing" edge 107 of an occluder 69 will cross axis A—A and permit light to pass into the system and the image of the edge 107 will be formed by the optical system at a point 110 which is spaced at one side of the aperture 100 an equal distance to the spacing between the trailing edge 107 and the object point 26. Likewise, a "leading" edge 109 in crossing axis A—A will block passage of the light and an image thereof will be formed at a point 108 which is spaced at the opposed side of the aperture 100 at a distance therefrom equal to the spacing between the leading edge 109 and the object point 26. Since image points 108 and 110 are substantially equally spaced with respect to the aperture 100 a signal will be formed by the photomultiplier 99 which will have characteristics indicating that the aperture 100 is at the focal point of the lens under test as described in the aforementioned copending patent application.

If the aperture is not located at the focal point of the lens under test the spacings of image points 108 and 110 with respect to the aperture 100 will be unequal. Then the photomultiplier 99 will form a signal having characteristics indicating such a condition and an electronic analysis of the signal will cause the motor 106 to operate in whichever direction is necessary to align the aperture 100 with the focal point of the lens 27 under test.

An arrow 111 or similar indicator is provided on the side of the bed 103 and is adapted to function co-operatively with a scale 112 on slide 101 to indicate the extent of movement of the aperture 100 and thus the focal characteristics of the lens under test.

It is particularly pointed out that the device described herein may be set for testing a succession of lenses all having essentially the same focal power, in which instance the distance between the lens holder and the neutral area 58 would be controlled according to the particular focal power of the lenses which are to be tested for centering, it being understood, of course, that if the instrument is to be used with lenses having a different focal power from that for which the instrument was initially adjusted, the distance between the neutral point 58 and the lens support would be adjusted accordingly.

However, with the instrument as shown and described herein where means is also provided for determining the focal power of the lens, the neutral point would be automatically moved to the proper spaced relation with the holder of the lens under test in response to the means for determining the focal power of the lens, and the device therefore could be used for successfully testing lenses of different focal powers. The movement of the lens or neutral point, in accomplishing the centering operation would take place simultaneously with the movement of the neutral point in determining the focal power of the lens, that is there would be a co-operative functioning between the respective means for bringing about these results.

In instances when the device is to be used for locating the optical center of negative lenses and/or for determining focal power of said lenses, a compensating positive lens is employed. This positive lens is such as to have a power which is controlled to compensate for the power of the negative lens under test and to further introduce a convergent power which is such as to bring the focal power of the light rays at a proper distance from the lens, that is at the point of focus 56 such as shown in Fig. 1 of the drawings. This compensation would be generally similar to that set forth in the copending application referred to herein.

Although the centering mechanism has been shown and described as embodying means for adjusting the lens 27 under test in a predetermined plane at right angles to axis A—A while retaining the reflecting member 57 in a relatively fixed position, it is to be understood that the device can be arranged so that the reflecting member will move in a vertical plane by suitable adjustment means similar to the lens supporting means shown in Figs. 1 and 2, while holding the lens 27 in position with its geometric center retained on axis A—A. In such a case, of course, the lens dotting mechanism must necessarily be supported for movement with the reflecting member 57.

It is apparent also that if desired the adjustment means shown in Fig. 1 for moving the aperture longitudinally of axis A—A can be adapted to the lens supporting structure whereupon the lens can be made to move longitudinally of axis A—A while holding the aperture in a fixed position. Such a construction would function substantially as satisfactorily as the preferred arrangement shown and described hereinbefore.

From the foregoing description it will be apparent that all of the objects and advantages of the invention have been accomplished to provide novel means for testing lenses to determine optical characteristics thereof such as the location of the optical center and the focal characteristics.

It will also be apparent that many changes may be made in the details of construction and arrangement of parts shown and described without departing from the spirit of the invention as expressed in the accompanying claims. Therefore, it is to be understood that all material set forth or shown in the accompanying drawings is to be interpreted as illustrative and not in a limiting sense.

We claim:

1. A device for determining the optical center of a lens comprising an optical system for directing light rays along a known optical axis toward a light-receiving means, a holder for supporting said light-receiving means and a second holder between said optical system and light-receiving means for supporting the lens under test in a plane intersecting and at right angles to said optical axis, one of said holders being movable, in directions normal to said optical axis, said second holder being spaced from said light-receiving means a distance approximating the focal length of the lens under test, said light-receiving means embodying a plurality of contiguously related reflecting areas arranged about a neutral area and angled rearwardly therefrom to define a substantial pyramid shape, said neutral area normally being substantially aligned with said optical axis, a photosensitive means in aligned adjacent relation with each of said reflecting areas for receiving from a respective one of said reflecting areas light rays which would be directed thereupon by the lens under test in instances when the optical center of said lens is not aligned with the neutral area of said light-receiving means, control means associated with said photosensitive means and energized by the illumination of at least one of said several photosensitive means, said control means being operably connected to said movable holder to move said holder in directions in a plane intersecting and at right angles to said optical axis an amount in accordance with the extent of deviation of the optical center of the lens from the optical axis of the device so as to cause the light rays influenced by said lens under test to be directed onto said neutral area of the reflecting member which will indicate that the lens under test has its optical center in alignment with said neutral area of the light-receiving means.

2. A device for determining the optical center of a lens comprising an optical system for directing light rays from a source of light along a known optical axis to a lens under test, holding means adjacent said optical system for supporting said lens in a plane intersecting and at right angles to said optical axis, said holding means being movable in transverse directions in said plane to adjust the lens in said plane, reflecting means in said optical system embodying a plurality of contiguous reflecting areas arranged about a neutral area located on said optical axis and which reflecting areas are angled to said axis to define a pyramid-like shape whose apex is toward the lens holder, a photosensitive means aligned with each of said reflecting areas for receiving therefrom light rays directed thereupon by said lens under test, said neutral area being located near the focus of the lens under test so that when the optical center of the lens is located on the optical axis of the device the light rays will be directed by the lens under test to the neutral area, and will be directed to one side thereof and onto at least one of said reflecting areas a distance in accordance with the offset location of the optical center of the lens under test with respect to said optical axis of the device so as to illuminate and energize a respective photosensitive means, automatically functioning control means associated with each of said photosensitive means and energized by the illumination of a respective photosensitive means, each of said control means being associated with the holding means for moving the lens under test in said plane to shift said lens under test relative to said reflecting means a distance and in a direction in accordance with the offset location of the optical center of the lens under test with respect to said optical axis so as to cause the light rays influenced by said lens under test to be directed onto said neutral area of the reflecting means, and thus locate the optical center of the lens on the optical axis of the device.

3. A device for determining the optical center of a lens comprising an optical system for directing light rays from a source of light along a known optical axis to a lens under test, holding means adjacent said optical system for supporting said lens in a plane intersecting and at right angles to said optical axis with the geometric center thereof normally substantially aligned with said optical axis, said holding means being movable to adjust the lens in said plane, reflecting means in said optical system embodying a plurality of contiguous reflecting areas angularly disposed to said optical axis and arranged about a neutral area, which neutral area is normally substantially aligned with said optical axis, said reflecting means being located near the focus of the lens under test so that light rays directed by said lens will be concentrated on the neutral area when the optical center of the lens lies on the optical axis of the device, and will be concentrated on a portion of at least one of said reflecting areas when the optical center is off the optical axis of the device, and a photosensitive means in aligned adjacent relation with each of said reflecting areas for receiving therefrom light rays directed thereupon by said lens under test so as to be energized by the concentration of light rays on said reflecting areas, and automatically functioning electrical control means associated with each of said photosensitive means operated by the energizing of a respective photosensitive means and connected with said holding means for moving the holding means in said plane to adjust the aligned relation of said lens under test and said reflecting member to the extent necessary to shift the concentration of the light rays influenced by said lens under test from the reflecting areas to said neutral area of the reflecting means and so align the optical center of the lens with the optical axis of the device, and indicating means connected with said holding means for registering the extent of such adjustment and consequently the deviation of the optical center from the geometrical center of the lens under test.

4. A device for determining the optical center of a lens comprising a source of light and a reflecting member arranged in aligned relation to the optical axis of the device, supporting means between said light source and reflecting member for supporting a lens under test in a plane intersecting and at right angles to said optical axis and with the geometric center of said lens normally substantially aligned with said optical axis, a holder for said reflecting member, said reflecting member embodying a plurality of contiguous reflecting areas rearwardly angled to said optical axis and arranged about a neutral area, which neutral area is normally substantially aligned with said optical axis, said holder being movable to adjust the reflecting member in a plane at right angles to said optical axis, the reflecting member being located near the focus of the lens under test so that the concentration of light rays from the lens under test will be on the neutral area when the lens has its optical center on the optical axis of the device and will be on at least one of the reflecting areas when its optical center is off the optical axis of the device, and a photosensitive means in aligned adjacent relation with each of said reflecting areas for receiving therefrom light rays directed thereupon by said lens under test so as to be energized by the concentration of light rays on a respective reflecting area when there is a variance between the geometric and optical centers of the lens under test, automatically functioning control means associated with each of said photosensitive means operated by the energizing of a respective photosensitive means and connected with said holder for automatically moving the holder in response to the energizing of said photosensitive means to laterally adjust the aligned relation of the optical center of said lens under test and the neutral area of said reflecting member to the extent necessary to cause the concentration of said light rays influenced by said lens under test to be shifted from said reflecting areas to said neutral area of the reflecting means, and indicating means connected with said movable holder which register effectively zero when said neutral area of the reflecting member is substantially aligned with said optical axis for registering the extent of such adjustment and consequently the space relation between the geometric and optical centers of the lens under test.

5. A device for determining the location of an unknown optical center with respect to a known geometric center of a lens comprising a light-receiving member having a plurality of angularly related contiguous reflecting areas arranged about a neutral area, means for directing light rays along a known optical axis toward said light-receiving member, a holder between said means and light-receiving member for supporting a lens under test in a plane at right angles to said optical axis and with the geometric center of the lens normally substantially aligned with said optical axis, a second holder for supporting said light-receiving member with the neutral area thereof normally substantially aligned with said optical axis and near the focus of the lens so that the light rays will be concentrated by the lens under test on the neutral area when the optical center of said lens is on the optical axis of the device and will be concentrated on at least one of the reflecting areas to one side of the neutral area in accordance with the amount the optical center of the lens is off said optical axis, one of said holders being movable, a photosensitive means in aligned adjacent relation with each of said reflecting areas of the light-receiving member for receiving therefrom light rays directed thereupon so as to be energized by the concentration of light rays on said reflecting areas by said lens under test when there is a variance between the geometric and optical centers of the lens under test, automatically functioning electrical control means operated by the energizing of at least one of said photosensitive means and associated with the movable holder for moving said holder in a predetermined direction within a plane normal to said optical axis to adjust the relation of the optical center of said lens under test and said neutral area of the light-receiving member to the extent necessary to cause the concentration of light rays influenced by said lens under test to be directed onto said neutral area, and electrically operated marking means on said device and operable in response to said adjustment to place an identifiable mark on the lens at the optical center thereof.

6. A device for determining the location of the optical center of a lens comprising light-receiving means embodying a pyramid-shaped member having a plurality of angularly related contiguous reflecting sides, the apex of said member being shaped to provide a relatively flat neutral area, a source of light located along a predetermined axis passing through said neutral area of the pyramid-shaped member, a movable holder supporting a lens under test in a plane intersecting and at right angles to said axis and with the geometric center of said lens aligned with said axis, said light-receiving means being spaced from the holder a distance approaching the focus of the lens to be tested so that the lens will concentrate the light rays on said neutral area when its optical center is on the optical axis of the device and will concentrate said light rays to one side of said area and onto a reflecting side a distance in accordance with the separation of its optical center from said optical axis, a photosensitive device disposed in aligned adjacent relation with each of the respective reflecting sides of the pyramid-shaped member for receiving light rays reflected by the respective reflecting sides so as to be energized by changes in intensities of light as received thereby from the lens under test and as reflected by the respective sides of the pyramid-shaped member, electric control means operated by the energizing of respective photosensitive devices and connected with said holder for moving the holder in a predetermined direction in a plane at right angles to said optical axis to adjust the lens under test to a position where the light rays will no longer be concentrated on the respective reflecting side but will be concentrated on said neutral area of the pyramid-shaped member, and means connected with said holder for visibly registering the extent of adjustment of the lens and the location of the optical center thereof.

7. A device for determining the location of the optical center of a lens comprising light-receiving means embodying a pyramid-shaped member having a plurality of contiguous reflecting sides, means directing light rays from a source of light along a predetermined axis passing through the apex of said pyramid-shaped member, a movable holder supporting a lens under test in a plane intersecting and at right angles to said axis and with the geometric center of said lens aligned with said axis so that the focus of the lens is near the apex of said pyramid-shaped member whereby the lens will concentrate the light rays on said apex when its optical center is on the optical axis of the device and will concentrate the light rays to one side of the pyramid-shaped member when its optical center is off the said optical axis, a photosensitive device disposed adjacent each of the respective reflecting sides of the pyramid-shaped member for receiving light rays reflected by the respective reflecting sides, said photo-sensitive devices being energized by the concentration of light as received thereby from the lens under test and as reflected by the respective sides of the pyramid-shaped member, when the geometric and optical centers of the lens under test do not coincide, electric control means operated by the energizing of said photosensitive devices and connected with said holder for moving the holder in a plane at right angles to said optical axis in a direction and amount necessary to adjust the lens under test to a position to cause the concentration of light rays by the lens to be moved from said reflecting side to the apex of the pyramid-shaped member, and marking means carried by said device and operable upon completion of said adjustment for visibly indicating on the lens under test where it intersects the optical axis of the device which will be the location of the optical center thereof.

8. A device for determining the location of the optical center of a lens comprising light-receiving means embodying a pyramid-shaped member having a plurality of contiguous reflecting sides, the apex of said member being shaped to provide a relatively flat neutral area, means directing light rays from a source of light along a predetermined axis passing through said neutral area of the pyramid-shaped member, a movable holder supporting a lens under test in a plane intersecting and at right angles to said axis and with the geometric center of said lens aligned with said axis which is at a distance from the light-receiving means approaching the focal length of the lens so that light will be concentrated to one side of said neutral area in accordance with the amount the optical center of the lens is off the optical axis of the device, a photosensitive device disposed adjacent each of the respective reflecting sides of the pyramid-shaped member for receiving light rays reflected by the respective reflecting sides, said photosensitive devices being energized by the concentration of light as received thereby from the lens under test and as reflected by the respective sides of the pyramid-shaped member when there is a variance between the geometric and optical centers of the lens under test, electric control means operated by the energizing of said photosensitive devices and connected with said holder for moving the holder in a direction and an amount in a plane at right angles to said optical axis sufficient to adjust the lens under test to the extent necessary to cause the concentration of light rays influenced thereby to be directed onto said neutral area of the pyramid-shaped member, marking means carried by said device and operable upon completion of said adjustment for visibly indicating on the lens under test where the lens intersects said optical axis of the device which will be the location of the optical center thereof, and means for determining the focal characteristics of said lens under test comprising photosensitive means energized upon concentration of the light rays on said neutral area, adjustment means for moving said light receiving means longitudinally of said axis, and electrical means operable in response to the energizing of said last-named photosensitive means to operate said adjustment means to move said light receiving means longitudinally of the optical axis to locate its neutral area at the focal point of the lens under test.

9. A device for determining the location of the optical center of a lens comprising light-receiving means embodying a pyramid-shaped member having a plurality of contiguous reflecting sides, the apex of said member being shaped to provide a relatively flat neutral area, an optical system for directing light rays from a source of light along a predetermined axis passing through said neutral area of the pyramid-shaped member, a movable holder for supporting a lens under test in a plane intersecting and at right angles to said axis and with the geometric center of said lens aligned with said axis and so that it is at a distance from said neutral area of the light receiving means approaching the focal length of the lens whereby said lens will concentrate light rays to one side of said neutral area a distance proportionate to the amount the optical center of the lens is off the optical axis of the device, a photosensitive device disposed adjacent each of the respective reflecting sides of the pyramid-shaped member for receiving light rays reflected by the respective reflecting sides, said photosensitive devices being energized by concentration of light on one of said respective sides of the pyramid-shaped member and reflected thereby to the photosensitive device when there is a spacing between the geometric and optical centers of the lens under test, light-modulating means in said optical system for varying the electrical output of the photosensitive devices at the modulating frequency of the light impinging thereupon from said reflecting sides of the pyramid-shaped member, electric control means operated by the energizing of said photosensitive devices and connected with said holder for moving the holder in a plane at right angles to said optical axis in a direction and amount sufficient to adjust the lens under test to a position where the light rays influenced thereby will be directed onto said neutral area of the pyramid-shaped member, said electric control means embodying means for rendering the electric control means relatively insensitive to the effect of stray light impinging upon the photosensitive devices, and means connected with said holder for visibly registering the extent of adjustment of the lens required to locate the optical center of the lens on the optical axis of the device.

10. A device for determining the location of the optical center of a lens comprising light-receiving means embodying a pyramid-shaped member having four angular related contiguous reflecting sides of generally spherical concave shape, the apex of said member being shaped to provide a relatively flat neutral area, an optical system for directing light rays from a source of light along a predetermined axis passing through said neutral area of the pyramid-shaped member, a movable holder supporting a lens under test in a plane intersecting and at right angles to said axis and with the geometric center of said lens aligned with said axis, said holder being spaced from the light receiving means a distance approaching that of the focal length of the lens whereby the lens will form an image of said light source spaced to one side of said neutral area in accordance with the amount the optical center of said lens is off the optical axis of the device, a photosensitive device aligned with each of the respective reflecting sides of the pyramid-shaped member for receiving light rays reflected by the respective reflecting sides, said photosensitive devices being energized by the light source image and as reflected thereto by the respective side of the pyramid-shaped member, light-modulating means in said optical system comprising a rotatable disk having a predetermined number of occluders arranged thereon, which occluders are adapted to intermittently permit and bar passage of light through the optical system upon rotation of the disk for varying the electrical output of the photosensitive devices at the modulating frequency of the light impinging thereupon from said reflecting sides of the pyramid-shaped member, electric control means operated by energizing of said respective photosensitive devices for moving the holder in a plane at right angles to said optical axis in a direction an amount sufficient to adjust the lens under test to the extent necessary to cause the light source image to be directed onto said neutral area of the pyramid-shaped member, said electric control means embodying means for rendering the electric control means relatively insensitive to the effect of stray light impinging upon the photosensitive devices and means connected with said holder for visibly registering the extent of adjustment of the lens and the location of the optical center thereof.

11. A device for determining the location of the optical center of a lens comprising a source of light and light receiving means aligned in spaced relation and on a common axis, said light-receiving means embodying a pyramid-shaped member having four rearwardly angled contiguous reflecting sides, the apex of said member being directed toward the light source and constituting a relatively flat neutral area on said axis about which the reflecting sides are arranged, an optical system for directing parallel light rays from said source of light along said axis passing through said neutral area of the pyramid-shaped member, a movable holder supporting a lens under test in a plane intersecting and at right angles to said axis and with the geometric center of said lens aligned with said axis, said holder being spaced from said light receiving means at a distance such that it forms an image of the light source not substantially larger than the neutral area at said light receiving means, said image being formed on the neutral area only when the lens has its optical center on the optical axis of said device and otherwise being formed on one of said reflecting sides in accordance with the offset location of the lens' optical center relative to said optical axis, a photosensitive device disposed adjacent each of the respective reflecting sides of the pyramid-shaped member for receiving light rays as reflected by the respective reflecting sides, said photosenstitive devices being energized by reflection of said image of the light source as received thereby from the lens under test and as reflected by the respective sides of the pyramid-shaped member, light-modulating means in said optical system comprising a rotatable disk having a predetermined number of occluders arranged thereon, which occluders are adapted to intermittently permit and bar passage of light through the optical system upon rotation of the disk for varying the electrical output of the photosensitive devices at the modulating frequency of the light impinging thereupon from said reflecting sides of the pyramid-shaped member, electric control means operated by energizing of said photosensitive devices for moving the holder in a plane at right angles to said optical axis to adjust the lens under test to a position in said plane where the light rays influenced by the lens will direct said image onto said neutral area of the pyramid-shaped member and not to the reflecting sides thereof, said electric control means embodying means for rendering the electric control means relatively insensitive to the effect of stray light impinging upon the photosensitive devices, means connected with said holder for visibly registering the extent of adjustment of the lens to locate the optical center thereof on said optical axis, and means for determining the focal characteristics of said lens under test comprising photosensitive means operable upon reception of the light rays by said neutral area, adjustment means for moving said light-receiving means longitudinally of said axis, and electrical means operable in response to energizing of said last-named photosensitive means to operate said adjustment means to locate the light receiving means at a distance from the lens holder where said neutral area will be at the focal point of the lens under test.

References Cited in the file of this patent
UNITED STATES PATENTS

| | | |
|---|---|---|
| 1,513,842 | Maynard | Nov. 4, 1924 |
| 2,304,814 | Glasser | Dec. 15, 1942 |
| 2,352,179 | Bolsey | June 27, 1944 |
| 2,369,622 | Toulon | Feb. 13, 1945 |
| 2,492,148 | Herbold | Dec. 27, 1949 |
| 2,563,892 | Waller et al. | Aug. 14, 1951 |
| 2,703,505 | Senn | Mar. 8, 1955 |